(12) United States Patent
Guo et al.

(10) Patent No.: US 9,907,026 B2
(45) Date of Patent: Feb. 27, 2018

(54) METHOD AND DEVICE FOR INTERACTING SIGNALING BETWEEN NODES, METHOD AND DEVICE FOR CONTROLLING POWER CONTROL AND UPLINK TRANSMISSION METHOD AND DEVICE

(71) Applicant: ZTE Corporation, Shenzhen (CN)

(72) Inventors: Senbao Guo, Shenzhen (CN); Bo Dai, Shenzhen (CN); Yunfeng Sun, Shenzhen (CN); Junfeng Zhang, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 15/029,378

(22) PCT Filed: May 16, 2014

(86) PCT No.: PCT/CN2014/077716
§ 371 (c)(1),
(2) Date: Jun. 28, 2016

(87) PCT Pub. No.: WO2014/187279
PCT Pub. Date: Nov. 27, 2014

(65) Prior Publication Data
US 2016/0316435 A1    Oct. 27, 2016

(30) Foreign Application Priority Data
Oct. 16, 2013   (CN) .......................... 2013 1 0486106

(51) Int. Cl.
*H04W 52/22*     (2009.01)
*H04W 52/14*     (2009.01)
(Continued)

(52) U.S. Cl.
CPC ......... *H04W 52/146* (2013.01); *H04W 52/54* (2013.01); *H04W 52/225* (2013.01);
(Continued)

(58) Field of Classification Search
CPC ............. H04W 52/146; H04W 52/225; H04W 52/242; H04W 52/262; H04W 52/34;
(Continued)

(56) References Cited

U.S. PATENT DOCUMENTS

| | | | |
|---|---|---|---|
| 2013/0250925 A1* | 9/2013 | Lohr ................. | H04W 72/0446 370/336 |
| 2015/0005027 A1* | 1/2015 | Zeng ................. | H04W 72/1278 455/522 |

FOREIGN PATENT DOCUMENTS

| | | |
|---|---|---|
| CN | 102724745 A | 10/2012 |
| CN | 103327595 A | 9/2013 |
| EP | 2343934 A1 | 7/2011 |

OTHER PUBLICATIONS

International Search Report for corresponding application PCT/CN2014/077716 filed May 16, 2014; dated Aug. 20, 2014.

* cited by examiner

*Primary Examiner* — Philip Sobutka
(74) *Attorney, Agent, or Firm* — Cantor Colburn LLP

(57) ABSTRACT

Provided is a method and device for interacting signaling between nodes, a method and device for controlling uplink power, and an uplink transmission method and device, wherein the method includes that: a node respectively receives uplink power control information transmitted by other nodes using a basic resource element as a unit, and transmits the uplink power control information of the node to the other nodes by using the basic resource element as a unit, wherein the basic resource element includes at least one of the followings: a terminal or a terminal cluster, and a (Continued)

basic unit resource. The disclosure solves the problem in the related art that an uplink power reduction method cannot ensure uplink transmission reliability in a double-link scenario, thus ensuring the accuracy of uplink transmission in the double-link scenario.

15 Claims, 6 Drawing Sheets

(51) Int. Cl.
  *H04W 52/54*  (2009.01)
  *H04W 52/36*  (2009.01)
  *H04W 52/24*  (2009.01)
  *H04W 52/26*  (2009.01)
(52) U.S. Cl.
  CPC ........ *H04W 52/242* (2013.01); *H04W 52/262* (2013.01); *H04W 52/36* (2013.01)
(58) Field of Classification Search
  CPC . H04W 72/0446; H04W 52/18; H04W 52/04; H04W 52/365; H04W 52/58; H04W 52/248
  USPC .................................. 455/522, 343.1, 343.2
  See application file for complete search history.

| M | T | P | T | M | M | T | T | M | P |

METHOD AND DEVICE FOR INTERACTING SIGNALING BETWEEN NODES, METHOD AND DEVICE FOR CONTROLLING POWER CONTROL AND UPLINK TRANSMISSION METHOD AND DEVICE

TECHNICAL FIELD

The disclosure relates to the field of communications, particularly to a method for interacting signalling between nodes, a method for controlling uplink power, and an uplink transmission method and device.

BACKGROUND

A NodeB needs to control uplink transmission power so as to acquire optimal uplink transmission power in Release 8/Release 9 of Long Term Evolution (LTE). The NodeB may measure uplink pass loss of a terminal so as to acquire a compensation value of the uplink path loss, and finally determines, according to factors including an interference measurement result of the NodeB, the receiving sensitivity of the NodeB, reduction in interference to an adjacent cell and so on, a power control factor for controlling the terminal to perform uplink transmission.

A carrier for aggregation in a Carrier Aggregation (CA) system is called a Component Carrier (CC) and is also known as a cell. In the meanwhile, the concepts of a Primary Component Carrier/Cell (PCC/PCell) and a Secondary Component Carrier/Cell (SCC/SCell) are also proposed. A CA-supported system at least includes a PCC and an SCC, wherein the PCC is always in an activated state.

The introduction of a CA technology enables a plurality of Physical Uplink Shared Channels (PUSCH) to perform transmission simultaneously on different CCs, and a PUSCH and a Physical Uplink Control Channel (PUCCH) may also perform transmission simultaneously on the same or different CCs.

In LTE and Long Term Evolution-Advanced (LTE-Advanced or LTE-A) systems, Uplink Control Information (UCI) includes downlink transmission Acknowledgement/Negative Acknowledgement (ACK/NACK), downlink physical Channel State Information (CSI) and an uplink Scheduling Request (SR). The UCI may support 5 downlink CCs. An uplink transmission multiplexing rule of UCI is partly summarized as follows according to LTE standard 36.213 (Physical layer procedures Release 11) of Release 11 of the $3^{rd}$ Generation Partnership Project (3GPP).

All UCI multiplexed on a PUCCH is only transmitted on a PCC of a PCell.

When simultaneous transmission of a PUCCH and a PUSCH is not supported, and at least one PUSCH performs transmission, UCI is multiplexed on one PUSCH. Generally, Periodic CSI (P-CSI) and/or ACK/NACK are/is transmitted on a PUSCH of a PCC. If the PUSCH of the PCC does not exist while a PUSCH of an SCC exists, the UCI is multiplexed on the PUSCH of the SCC. If a plurality of SCC PUSCHs exists on one sub-frame, the P-CSI and/or ACK/NACK are/is transmitted on an SCC PUSCH having the smallest cell index.

When simultaneous transmission of a PUCCH and a PUSCH is supported, and at least one PUSCH performs transmission, ACK/NACK is transmitted on the PUCCH. Generally, P-CSI is transmitted on a PCC PUSCH. If the PCC PUSCH does not exist while a PUSCH of an SCC exists, the P-CSI is multiplexed on the SCC PUSCH. If a plurality of SCC PUSCHs exists on one sub-frame, the P-CSI is transmitted on an SCC PUSCH having the smallest cell index.

Limited by the UCI multiplexing rule, UCI of an evolved Node B (eNodeB) may be multiplexed and transmitted on an uplink CC of another eNodeB, and the latter further transmits UCI to the former through backhaul between the eNodeBs.

In a CA-supported system, uplink power is controlled based on the UCI multiplexing rule. An eNodeB performs uplink scheduling according to Power Headroom Reporting (PHR) of a User Equipment (UE) so as to allocate an uplink transmission resource, a Modulation and Coding Scheme (MCS) and transmission power for each CC. However, the sum of the transmission power of the CCs may still exceed the maximum total transmission power allowed by the terminal/UE. In this case, the UE needs to reduce the power.

According to LTE standard 36.213 of Release 11, when a PUCCH and a PUSCH not carrying UCI performs transmission simultaneously, the transmission power of a PUSCH of each CC is reduced according to the same proportion factor if the total transmission power of a UE exceeds the maximum transmission power. When a PUSCH carrying UCI performs transmission on a certain cell while PUSCHs not carrying UCI perform transmission other cells, the power of the carrier PUSCHs not carrying UCI is reduced according to the same proportion factor if the total transmission power of the UE exceeds the maximum transmission power. If a PUSCH and a PUCCH carrying UCI perform transmission simultaneously on a certain cell while PUSCHs not carrying UCI perform transmission on other cells, the power required by the PUCCH is allocated for the PUCCH first if the total transmission power of the UE exceeds the maximum transmission power, and the remaining power, if any, is allocated to the PUSCH carrying UCI. If there is still remaining power, the power of the carrier PUSCHs not carrying UCI is reduced according to the same proportion factor, and the reduced power does not exceed the remaining power.

The uplink power reduction control method is designed for an existing UCI multiplexing rule of a CA system, and backhaul between double-link eNodeBs is unsatisfactory and has a long time delay. Uplink UCI of different eNodeBs needs to be independently transmitted to corresponding eNodeBs, thus a UCI multiplexing rule is different from the existing CA system multiplexing rule. For example, UCI (ACK/NACK, CSI, or SRs) of different eNodeBs may be transmitted simultaneously on CCs of their respective eNodeBs. The UCI may be multiplexed on two PUCCHs or PUSCHs of different eNodeBs on the same sub-frame or transmitted by other channel combination forms different from those specified by the existing UCI multiplexing rule. Besides, since some uplink control information and scheduling information can be hardly interacted in real time between two double-link nodes, NodeBs fail to acquire the scheduling information, and only uplink data and control information corresponding to one NodeB are transmitted on some sub-frames while uplink data and control information corresponding to two NodeBs are transmitted on some sub-frames. At the moment, since the two NodeBs perform power control independently, the power of transmission on two uplink sub-frames may exceed the maximum transmission power of a terminal. For a CA mechanism, since a plurality of CCs are located on the same node or different nodes with ideal backhaul, and scheduling information is interacted in real time, a NodeB may approximately calculate sub-frames on which the power of the terminal exceeds the maximum value, and limits reception of uplink data and control information on the corresponding sub-frames according to a standard of the terminal, thereby ensuring the receiving accuracy of the NodeB.

However, a NodeB fails to perform corresponding estimation and reception with a terminal due to the absence of ideal backhaul in a double-link scenario, thus resulting in receiving errors of uplink data and control information, and affecting the average spectral efficiency of the system.

Therefore, there is uplink transmission against the existing CA system UCI multiplexing rule in double links. The existing uplink power reduction method fails provide a solution if the total power of different CCs exceeds the maximum total transmission power allowed by a UE, and it is necessary to redesign a new method for controlling uplink power.

At present, there is not effective solution for the problem in the related art that an uplink power reduction method cannot ensure uplink transmission reliability in a double-link scenario.

SUMMARY

Embodiments of the disclosure provide a method and device for interacting signaling between nodes, a method and device for controlling uplink power, and an uplink transmission method and device, so as to at least solve the problem above.

A method for interacting signaling between nodes is provided according to an aspect of the embodiments of the disclosure, wherein the method includes that: a node respectively receives uplink power control information transmitted by other nodes using a basic resource element as a unit, and transmits, the uplink power control information of the node to the other nodes by using the basic resource element as a unit, wherein the basic resource element includes at least one of the followings: a terminal or a terminal cluster, and a basic unit resource.

Preferably, the uplink power control information may be used for indicating uplink power information of the basic resource element of the node transmitting the uplink power control information.

Preferably, the basic unit resource may include at least one of the followings: a resource block, a resource block pair, a Resource Block Group (RBG), a sub-band, a sub-frame, and a radio frame.

Preferably, the uplink power control information may include at least one of the followings: $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, and $P_{SRS\_OFFSET}$ are respectively defined according to the 3GPP TS36.213 V11.4.0.

Preferably, the $P_{offset}$ may include a power offset value of uplink transmission of a node transmitting the uplink power control information, wherein the power offset value is used for indicating the average uplink power of the basic resource element of the node transmitting the uplink power control information.

A method for controlling uplink power is further provided according to another aspect of the embodiments of the disclosure, including that a plurality of pieces of combined power control information is generated, wherein each of the plurality of pieces of combined power control information respectively includes: an uplink power control factor and/or MCS offset information; and the plurality of pieces of combined power control information is transmitted to a terminal.

Preferably, each piece of combined power control information may be used for controlling the power used by the terminal to transmit uplink data and/or control information.

Preferably, the uplink power control factor may include at least one of the followings: $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a relevant offset factor of any uplink power control factor above, and a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$ and $P_{SRS\_OFFSET}$ are respectively defined according to the 3GPP TS36.213 V11.4.0, and the relevant offset factor is used for indicating an offset value of a corresponding uplink power control factor in a latter piece of combined uplink power control information in the plurality of pieces of combined power control information relative to a former piece of combined power control information.

Preferably, the $P_{offset}$ may include a power offset value for indicating uplink transmission power of the terminal, wherein the power offset value is used for indicating an offset of combined power control information, which is after first combined power control information in the plurality of pieces of combined power control information, relative to the first combined power control information.

Preferably, after the plurality of pieces of combined power control information is transmitted to the terminal, the method may further include that: the uplink data and/or the control information transmitted by the terminal are/is received according to the plurality of pieces of combined power control information.

Preferably, that the uplink data and/or the control information transmitted by the terminal are/is received according to the plurality of pieces of combined power control information may include that: in the case that the uplink data and/or the control information transmitted by the terminal are/is received successfully according to a piece of combined power control information among the plurality of pieces of combined power control information, the uplink data and/or the control information are/is stopped from being received according to other combined power control information among the plurality of pieces of combined power control information.

Preferably, after the uplink data and/or the control information transmitted by the terminal are/is received according to the plurality of pieces of combined power control information, the method may further include that: configuration of an uplink sub-frame used for retransmitting the uplink data and/or the control information is determined according to combined power control information used for receiving the uplink data and/or the control information last time; and the uplink data and/or the control information retransmitted by the terminal are/is received through the uplink sub-frame determined according to the configuration.

An uplink transmission method is further provided according to still another aspect of the embodiments of the disclosure, including that: a plurality of pieces of combined power control information which is transmitted by a node and applied to uplink transmission of the node is received, wherein each of the plurality of pieces of combined power control information includes: an uplink power control factor and/or MCS offset information; and uplink data and/or control information are/is transmitted according to the plurality of pieces of combined power control information.

Preferably, the uplink power control factor may include at least one of the followings: $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a relevant offset factor of any uplink power control factor above, and a power offset factor $P_{offset}$, wherein $P_{O\_PUSCH}$, $\alpha P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, and $P_{SRS\_OFFSET}$ are respectively defined according to the 3GPP TS36.213 V11.4.0, and the relevant offset factor is used for indicating an offset value of a corresponding uplink power control factor in a latter piece of combined uplink power control information in the plurality of pieces of combined power control information relative to a former piece of combined power control information.

Preferably, the $P_{offset}$ may include a power offset value for indicating uplink transmission power of a terminal, wherein the power offset value is used for indicating an offset of combined power control information, which is after first combined power control information in the plurality of pieces of combined power control information, relative to the first combined power control information.

Preferably, that the plurality of pieces of combined power control information transmitted by the node is received may include that: the plurality of pieces of combined power control information which is transmitted by a plurality of nodes, and is respectively used for uplink transmission of the plurality of nodes is received.

Preferably, in the case that a terminal transmits the uplink data and/or the control information on one sub-frame, that the uplink data and/or the control information are/is transmitted according to the plurality of pieces of combined power control information may include that: whether the uplink data and/or the control information of the two nodes are/is transmitted on the one sub-frame simultaneously is judged; and in the case that only uplink data and/or control information of one node are/is transmitted on the one sub-frame, the uplink data and/or the control information are/is transmitted according to first combined power control information among the plurality of pieces of combined power control information of the one node, or according to combined power control information with the smallest index value.

Preferably, in the case that a terminal transmits the uplink data and/or the control information on one sub-frame, that the uplink data and/or the control information are/is transmitted according to the plurality of pieces of combined power control information may include that: whether the uplink data and/or the control information of the two nodes are/is transmitted on the one sub-frame simultaneously is judged; and in the case that uplink data and/or control information of the plurality of nodes are/is transmitted on the one sub-frame, the uplink data and/or the control information are/is transmitted according to one piece of the plurality of pieces of combined power control information respectively corresponding to the each node.

Preferably, that the uplink data and/or the control information are/is transmitted according to one piece of the plurality of pieces of combined power control information respectively corresponding to the each node may include that: whether the transmission power for transmitting the uplink data and/or the control information according to first combined power control information among the plurality of pieces of combined power control information, which are corresponding to the each node or combined power control information having the smallest index value, exceeds the maximum transmission power of the terminal is judged; and if no, the uplink data and/or the control information are/is transmitted according to the first combined power control information among the corresponding plurality of pieces of combined power control information.

Preferably, in the case that it is judged that the transmission power for transmitting the uplink data and/or the control information according to the first combined power control information among the plurality of pieces of combined power control information corresponding to the each node or the combined power control information having the smallest index value exceeds the maximum transmission power of the terminal, that the uplink data and/or the control information are/is transmitted according to one piece of the plurality of pieces of combined power control information respectively corresponding to the each node may further include that: whether the transmission power for transmitting the uplink data and/or the control information according to second combined power control information among the plurality of combined power control information corresponding to the nodes, or a node having a low priority among the plurality of nodes exceeds the maximum transmission power of the terminal is judged; and if no, the uplink data and/or the control information of the nodes, or the node having a low priority among the plurality of nodes are/is transmitted according to the second combined power control information among the corresponding plurality of pieces of combined power control information.

Preferably, in the case that it is judged that the transmission power for transmitting the uplink data and/or the control information according to the second combined power control information among the plurality of combined power control information corresponding the node having a low priority among the plurality of nodes exceeds the maximum transmission power of the terminal, that the uplink data and/or the control information are/is transmitted according to one piece of the plurality of pieces of combined power control information respectively corresponding to the each node may further include that: whether the transmission power for transmitting the uplink data and/or the control information according to the second combined power control information among the plurality of pieces of combined power control information corresponding to a node having a high priority among the plurality of nodes exceeds the maximum transmission power of the terminal is judged; and if no, the uplink data and/or the control information of the node having a high priority are/is transmitted according to the second combined power control information among the corresponding plurality of combined power control information.

Preferably, after the uplink data and/or the control information are/is transmitted according to the plurality of combined power control information, the method may further include that: the uplink data and/or the control information are/is retransmitted according to combined power control information for transmitting the uplink data and/or the control information last time.

A device for interacting signaling between nodes is further provided according to still another aspect of the embodiments of the disclosure, wherein the device is located in a node and includes: an interacting component configured to respectively receive uplink power control information transmitted by other nodes using a basic resource element as a unit, and transmit the uplink power control information of a node to the other nodes by using the basic resource element as a unit, wherein the basic resource element includes at least one of the followings: a terminal or a terminal cluster, and a basic unit resource.

A device for controlling uplink power is further provided according to still another aspect of the embodiments of the disclosure, including: a generating component, configured to generate a plurality of pieces of combined power control information, wherein each of the plurality of pieces of combined power control information includes: an uplink power control factor and/or MCS offset information; and a transmitting component, configured to transmit the plurality of pieces of combined power control information to a terminal.

An uplink transmission device is further provided according to still another aspect of the embodiments of the disclosure, including: a receiving component, configured to receive a plurality of pieces of combined power control information which is transmitted by a node and applied to uplink transmission of the node, wherein each of the plurality of pieces of combined power control information includes: an uplink power control factor and/or MCS offset information; and a transmitting component, configured to transmit uplink data and/or control information according to the plurality of pieces of combined power control information.

By means of the embodiments of the disclosure, a node respectively receives uplink power control information transmitted by other nodes using a basic resource element as a unit, and transmits the uplink power control information of the node to the other nodes by using the basic resource element as a unit, wherein the basic resource element includes at least one of the followings: a terminal or a terminal cluster, and a basic unit resource. The disclosure solves the problem in the related art that an uplink power reduction method cannot ensure uplink transmission reliability in a double-link scenario, thus ensuring the accuracy of uplink transmission in the double-link scenario.

BRIEF DESCRIPTION OF THE DRAWINGS

The accompanying drawings described herein are used for providing further understanding to the disclosure and form a part of the present application. The schematic embodiments of the disclosure and description thereof are used for explaining the disclosure, instead of forming improper limitation to the disclosure. In the accompanying drawings.

DETAILED DESCRIPTION OF THE EMBODIMENTS

It needs to be noted that the embodiments in the present application and the characteristics in the embodiments may be combined with each other if there is no conflict. The disclosure will be expounded hereinafter with reference to the accompanying drawings and in conjunction with the embodiments.

Figure 1:
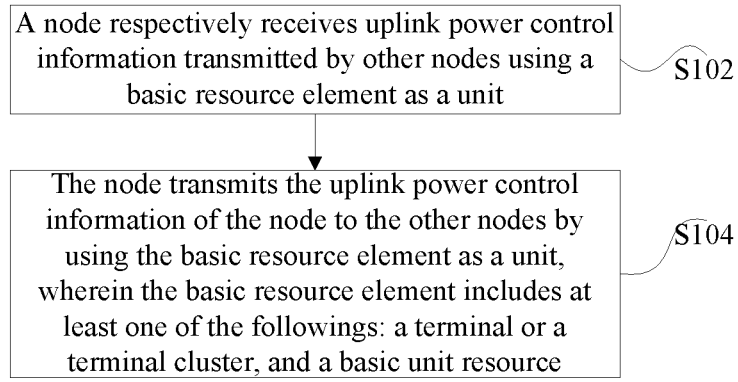
FIG. 1 shows a flowchart of a method for interacting signaling between nodes according to an embodiment of the disclosure.

The steps illustrated in the flowcharts of the accompanying drawings may be executed in a computer system such as a group of computer executable instructions, and although logical sequences have been shown in the flowcharts, in some cases, the steps as illustrated or described may be executed according to sequences different from those herein. For example, Step 102 and Step 104 as shown in FIG. 1 may be executed in no particular order or executed simultaneously during execution.

The present embodiment provides a method for interacting signaling between nodes. FIG. 1 is a flowchart of a method for interacting signaling between nodes according to an embodiment of the disclosure. As shown in FIG. 1, the flow includes the following steps.

Step 102: A node respectively receives uplink power control information transmitted by other nodes using a basic resource element as a unit.

Step 104: The node transmits the uplink power control information of the node to the other nodes by using the basic resource element as a unit, wherein the basic resource element includes at least one of the followings: a terminal or a terminal cluster, and a basic unit resource.

By means of the steps above, uplink power control information is interacted among a plurality of nodes (e.g. a plurality of NodeBs) by using a basic resource element as a unit. For example, double-link nodes may acquire uplink power control information of corresponding nodes in a double-link scenario, so that the nodes may cooperate with each other to complete uplink transmission of a terminal, thereby solving the problem in the related art that an uplink power reduction method cannot ensure uplink transmission reliability in a double-link scenario, and ensuring the accuracy of uplink transmission in the double-link scenario.

Preferably, the uplink power control information is used for indicating uplink power information of the basic resource element of a node transmitting the uplink power control information.

Preferably, the basic unit resource may include at least one of the following resources: a resource block, a resource block pair, an RBG a sub-band, a sub-frame, and a radio frame.

Preferably, the uplink power control information includes at least one of the followings: $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$ and $P_{SRS\_OFFSET}$ are parameters respectively defined according to the 3GPP TS36.213 V11.4.0.

Preferably, the $P_{offset}$ includes a power offset value of uplink transmission of a node transmitting the uplink power control information, wherein the power offset value is used for indicating the average uplink power of the element resource element of the node transmitting the uplink power control information.

Figure 2:
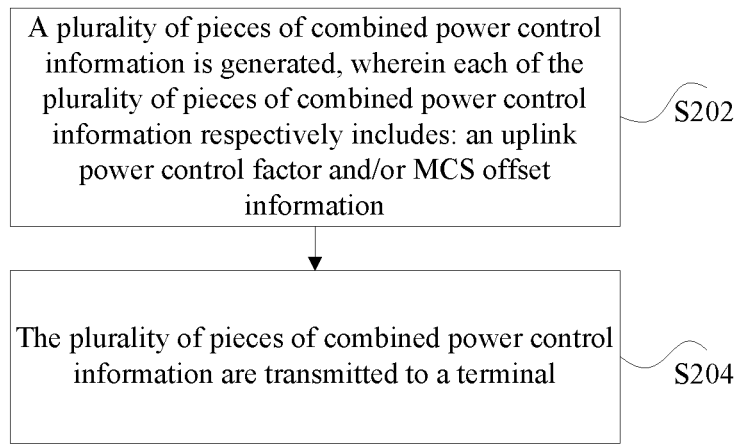
FIG. 2 shows a flowchart of a method for controlling uplink power according to an embodiment of the disclosure.

The present embodiment further provides a method for controlling uplink power. FIG. 2 is a flowchart of a method for controlling uplink power according to an embodiment of the disclosure. As shown in FIG. 2, the flow includes the following steps.

Step 202: A plurality of pieces of combined power control information is generated, wherein each of the plurality of pieces of combined power control information respectively includes: an uplink power control factor and/or MCS offset information.

Step 204: The plurality of pieces of combined power control information are transmitted to a terminal.

The MCS offset information is defined as $\Delta_{Mcs}$. The MCS offset information is used for adjusting an MCS value in Uplink Grant (UL_Grant), and a terminal transmits uplink data and/or control information by using the adjusted MCS according to the MCS offset information.

By means of the steps above, a plurality of pieces of combined power control information is provided to a terminal for use, so that the terminal may flexibly apply different combined power control information to perform uplink transmission, thus solving the problem in the related art that an uplink power reduction method cannot ensure uplink transmission reliability in a double-link scenario, and ensuring the accuracy of uplink transmission in the double-link scenario.

Preferably, each piece of combined power control information is used for controlling the terminal to transmit uplink data and/or control information.

Preferably, the uplink power control factor includes at least one of the followings: $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a relevant offset factor of any uplink power control factor above, and a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$ and $P_{SRS\_OFFSET}$ are respectively defined according to the 3GPP TS36.213 V11.4.0, and the relevant offset factor is used for indicating an offset value of a corresponding uplink power control factor in a latter piece of combined uplink power control information in the plurality of pieces of combined power control information relative to a former piece of combined power control information. For example, the first combined power control information among the plurality of pieces of combined power control information corresponding to one node carries $P_{O\_PUSCH}$, then an offset value relative to the $P_{O\_PUSCH}$ carried in the first combined power control information is respectively carried in other combined power control information having an index value larger than that of the first combined power control information. Of course, the method above is a preferred embodiment, and the present embodiment is not limited thereto. For example, different $P_{O\_PUSCH}$ may be also carried in second, third to $N^{th}$ combined power control information.

Preferably, uplink transmission power indicated by the first, the second to the $N^{th}$ combined power control information among the plurality of pieces of combined power control information which corresponds to one node and is sorted in an ascending order according to index values may present a declining rule.

Preferably, the $P_{offset}$ includes a power offset value for indicating uplink transmission power of the terminal, wherein the power offset value is used for indicating an offset of combined power control information, which is after the first combined power control information in the plurality of pieces of combined power control information, relative to the first combined power control information.

Preferably, after Step 204, the terminal transmits the uplink data and/or the control information according to one piece of the plurality of pieces of combined power control information while a node (a NodeB) receives, according to the plurality of pieces of combined power control information, the uplink data and/or the control information transmitted by the terminal. For example, the node attempts to apply configuration corresponding to the first combined power control information among the plurality of combined power control information to receive the uplink data and/or the control information transmitted by the terminal, and in the case that the node fails to receive the uplink data and/or the control information, the node attempts to apply configuration corresponding other combined power control information again to receive the uplink data and/or the control information transmitted by the terminal.

Preferably, in the case that the uplink data and/or the control information transmitted by the terminal are/is received successfully according to a piece of combined power control information among the plurality of pieces of combined power control information, the uplink data and/or the control information may be stopped from being received according to other combined power control information among the plurality of pieces of combined power control information.

Preferably, after the uplink data and/or the control information transmitted by the terminal are/is received according to the plurality of pieces of combined power control information, if the uplink data and/or the control information needs to be retransmitted, configuration of an uplink sub-frame used for retransmitting the uplink data and/or the control information may be determined according to combined power control information used for receiving the uplink data and/or the control information last time; and the uplink data and/or the control information retransmitted by the terminal are/is received through the uplink sub-frame configured according to the configuration. Preferably, an MCS for receiving the uplink data and/or the control information last time may be determined according to the combined power control information for receiving the uplink data and/or the control information last time. In other words, the configuration of the uplink sub-frame for retransmitting the uplink data and/or the control information may be also determined according to the MCS for receiving the uplink data and/or the control information last time, and the uplink data and/or the control information retransmitted by the terminal are/is received by the uplink sub-frame configured according to the configuration.

Figure 3:
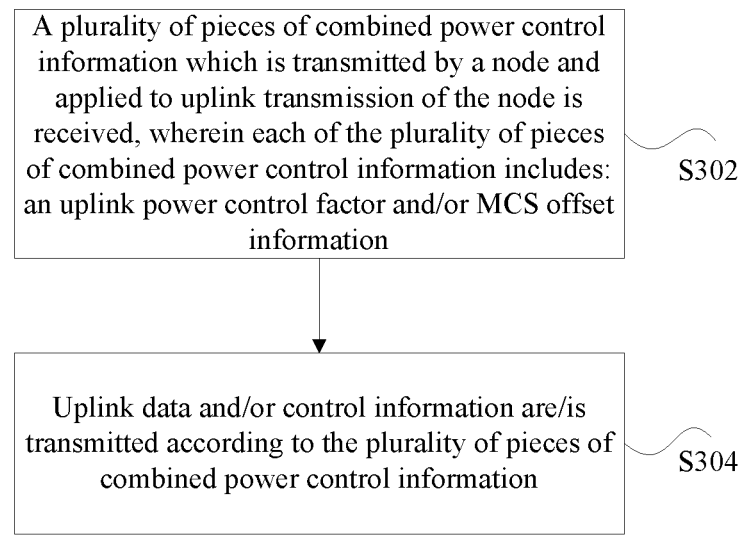
FIG. 3 shows a flowchart of an uplink transmission method according to an embodiment of the disclosure.

The present embodiment further provides an uplink transmission method. FIG. 3 is a flowchart of an uplink transmission method according to an embodiment of the disclosure. As shown in FIG. 3, the flow includes the following steps.

Step 302: A plurality of pieces of combined power control information which is transmitted by a node and applied to uplink transmission of the node is received, wherein each of the plurality of pieces of combined power control information includes: an uplink power control factor and/or MCS offset information.

Step 304: Uplink data and/or control information are/is transmitted according to the plurality of pieces of combined power control information.

By means of the steps above, uplink transmission is performed by applying a plurality of pieces of combined power control information provided by a node (e.g. a NodeB), thus solving the problem in the related art that an uplink power reduction method cannot ensure uplink transmission reliability in a double-link scenario, and ensuring the accuracy of uplink transmission in the double-link scenario.

Preferably, the uplink power control factor includes at least one of the followings: $P_{O\_PUSCH}$, $\alpha$, $P_{O\_NOMINAL\_PUSCH}$, $PL$, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a relevant offset factor of any uplink power control factor above, and a power offset factor $P_{offset}$, wherein $P_{O\_PUSCH}$, $\alpha$, $P_{O\_NOMINAL\_PUSCH}$, $PL$, $\beta_{offset}^{PUSCH}$, $P_{O\_PUCCH}$, $P_{O\_PUCCH\_offset}$, $P_{O\_NOMINAL\_PUCCH}$, and $P_{SRS\_OFFSET}$ are respectively defined according to the 3GPP TS36.213 V11.4.0, and the relevant offset factor is used for indicating an offset value of a corresponding uplink power control factor in a latter piece of combined uplink power control information in the plurality of pieces of combined power control information relative to a former piece of combined power control information.

Preferably, the $P_{offset}$ includes a power offset value for indicating uplink transmission power of a terminal, wherein the power offset value is used for indicating an offset of combined power control information, which is after first combined power control information in the plurality of pieces of combined power control information, relative to the first combined power control information.

Preferably, Step 302 includes that: the plurality of pieces of combined power control information, which are transmitted by a plurality of nodes and are respectively used for uplink transmission of the nodes, are received, wherein the plurality of nodes includes two or more nodes of double-linked configuration.

Preferably, in a double-link scenario, in the case that a terminal transmits the uplink data and/or the control information on one sub-frame, the terminal first judges whether the uplink data and/or the control information of the plurality of nodes are/is transmitted on the one sub-frame simultaneously; and in the case that it is determined that the uplink data and/or the control information of only one node are/is transmitted on the one sub-frame, the uplink data and/or the control information are/is transmitted according to first combined power control information among the plurality of pieces of combined power control information of the one node, or according to combined power control information with the smallest index value.

Preferably, in the case that it is determined that uplink data and/or control information of the plurality of nodes are/is transmitted on the one sub-frame, the uplink data and/or the control information are/is transmitted according to one piece of the plurality of pieces of combined power control information respectively corresponding to the nodes, wherein the one piece of the plurality of pieces of combined power control information is selected according to a preset condition.

Preferably, when the uplink data and/or the control information are/is transmitted according to one piece of the plurality of pieces of combined power control information respectively corresponding to the nodes, whether the transmission power for transmitting the uplink data and/or the control information according to first combined power control information among the plurality of pieces of combined power control information corresponding to the nodes or combined power control information having the smallest index value exceeds the maximum transmission power of the terminal may be judged first; and if no, the uplink data and/or the control information are/is transmitted according to the first combined power control information among the corresponding plurality of pieces of combined power control information;

preferably, in the case that it is judged that the transmission power for transmitting the uplink data and/or the control information according to the first combined power control information among the plurality of pieces of combined power control information corresponding to the nodes or the combined power control information having the smallest index value exceeds the maximum transmission power of the terminal, that the uplink data and/or the control information are/is transmitted according to one piece of the plurality of pieces of combined power control information respectively corresponding to the nodes further includes that: whether the transmission power for transmitting the uplink data and/or the control information according to second combined power control information among the plurality of combined power control information corresponding to the nodes, or a node having a low priority among the plurality of nodes exceeds the maximum transmission power of the terminal is judged; and if no, the uplink data and/or the control information of the nodes, or the node having a low priority among the plurality of nodes are/is transmitted according to the second combined power control information among the corresponding plurality of pieces of combined power control information. Besides, uplink data and/or control information of a node having a high priority may be still transmitted by using the first combined power control information;

preferably, in the case that it is judged that the transmission power for transmitting the uplink data and/or the control information according to the second combined power control information among the plurality of combined power control information corresponding the node having a low priority among the plurality of nodes exceeds the maximum transmission power of the terminal, that the uplink data and/or the control information are/is transmitted according to one piece of the plurality of pieces of combined power control information respectively corresponding to the nodes further includes that: whether the transmission power for transmitting the uplink data and/or the control information according to the second combined power control information among the plurality of pieces of combined power control information corresponding to a node having a high priority among the plurality of nodes exceeds the maximum transmission power of the terminal is judged; and if no, the uplink data and/or the control information of the node having a high priority are/is transmitted according to the second combined power control information among the corresponding plurality of combined power control information.

Preferably, the transmission power corresponding to the first combined power control information of the respective node or the combined power control information, having the smallest index value, of the respective node is not smaller than the transmission power corresponding to the second combined power control information.

For example, in the case that the uplink data and/or the control information of the plurality of nodes are/is transmitted on one sub-frame, and the transmission power for transmitting the uplink data and/or the control information according to the first combined power control information among the plurality of pieces of combined power control information corresponding to the nodes exceeds the maximum transmission power of the terminal, it is determined that a piece of combined power control information corresponding to a node having a low priority among the plurality of nodes is combined power control information besides the first combined power control information. In other words, the uplink data and/or the control information of the node having a low priority are/is transmitted preferentially by applying the second combined power control information (or the $N^{th}$ combined power control information, where N is larger than 1) among the plurality of pieces of combined power control information corresponding to the node, so as to reduce the transmission power of the terminal, and ensure that the transmission power of the terminal does not exceed the maximum transmission power of the terminal, while in the case that the transmission power of the terminal still exceeds the maximum transmission power of the terminal, the uplink data and/or the control information of a node having a high priority are/is then transmitted also by applying the second combined power control information among the plurality of pieces of combined power control information corresponding to the node, and so on. The terminal may respectively apply the second, the third, the fourth, . . . the $N^{th}$ combined power control information to perform uplink transmission of a corresponding node, so as to ensure that the transmission power of the terminal does not exceed the maximum transmission power of the terminal.

Preferably, after the uplink data and/or the control information are/is transmitted according to the plurality of combined power control information, if the uplink data and/or the control information need/needs to be retransmitted, the uplink data and/or the control information may be retransmitted according to combined power control information or an MCS for transmitting the uplink data and/or the control information last time.

The present embodiment further provides a device for interacting signaling between nodes. The device is located in a node, and configured to implement the method for interacting signaling between nodes. It needs to be noted that, functional implementation corresponding to the device embodiment may be described and explained in combination with the method embodiment above.

The device for interacting signaling between nodes includes: a transceiver component configured to respectively receive uplink power control information transmitted, using a basic resource element as a element, by other nodes, and transmit the uplink power control information of a node to the other nodes by using the basic resource element as a unit, wherein the basic resource element includes at least one of the followings: a terminal or a terminal cluster, and a basic unit resource.

Preferably, the uplink power control information is used for indicating uplink power information of the basic resource element of a node transmitting the uplink power control information.

Preferably, the basic unit resource may include at least one of the followings: a resource block, a resource block pair, an RBG a sub-band, a sub-frame, and a radio frame.

Preferably, the uplink power control information includes at least one of the followings: $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$ and $P_{SRS\_OFFSET}$ are respectively defined according to the 3GPP TS36.213 V11.4.0.

Preferably, the $P_{offset}$ includes a power offset value of uplink transmission of a node transmitting the uplink power control information, wherein the power offset value is used for indicating the average uplink power of the element resource element of the node transmitting the uplink power control information.

The present embodiment further provides a device for controlling uplink power. The device is configured to implement the method for controlling uplink power. It needs to be noted that functional implementation corresponding to the device embodiment may be described and explained in combination with the method embodiment above.

Figure 4:
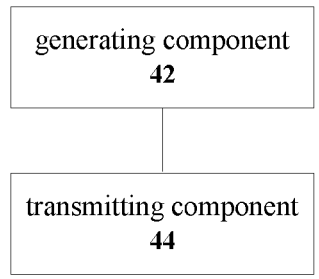
FIG. 4 shows a structural diagram of an device for controlling uplink power according to an embodiment of the disclosure.

FIG. 4 is a structural diagram of a device for controlling uplink power according to an embodiment of the disclosure. As shown in FIG. 4, the device includes: a generating component 42 and a transmitting component 44, wherein the generating component 42 is configured to generate a plurality of pieces of combined power control information, wherein each of the plurality of pieces of combined power control information includes: an uplink power control factor and/or MCS offset information; and the transmitting component 44 is coupled to the generating component 42 and configured to transmit the plurality of pieces of combined power control information to a terminal.

Preferably, each piece of combined power control information is used for controlling the terminal to transmit uplink data and/or control information.

Preferably, the uplink power control factor includes at least one of the followings: $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a relevant offset factor of any uplink power control factor above, and a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$ and $P_{SRS\_OFFSET}$ are respectively defined according to the 3GPP TS36.213 V11.4.0, and the relevant offset factor is used for indicating an offset value of a corresponding uplink power control factor in a latter piece of combined uplink power control information in the plurality of pieces of combined power control information relative to a former piece of combined power control information.

Preferably, the $P_{offset}$ includes a power offset value for indicating uplink transmission power of the terminal, wherein the power offset value is used for indicating an offset of combined power control information after first combined power control information in the plurality of pieces of combined power control information relative to the first combined power control information.

Figure 5:
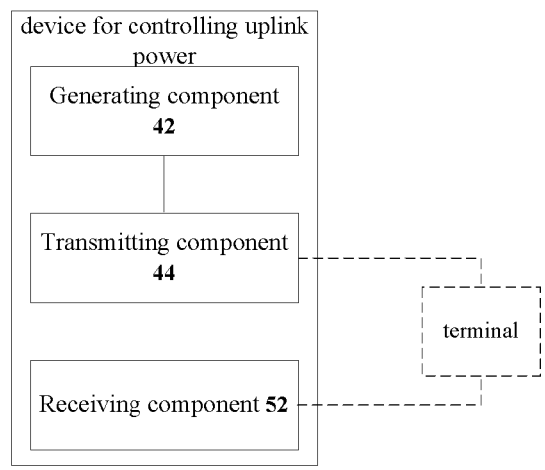
FIG. 5 shows the first preferred structural diagram of a device for controlling uplink power according to an embodiment of the disclosure.

FIG. 5 is the first preferred structural diagram of a device for controlling uplink power according to an embodiment of the disclosure. As shown in FIG. 5, the device preferably further includes: a receiving component 52, configured to receive, according to a plurality of pieces of combined power control information, uplink data and/or control information transmitted by a terminal.

Figure 6:
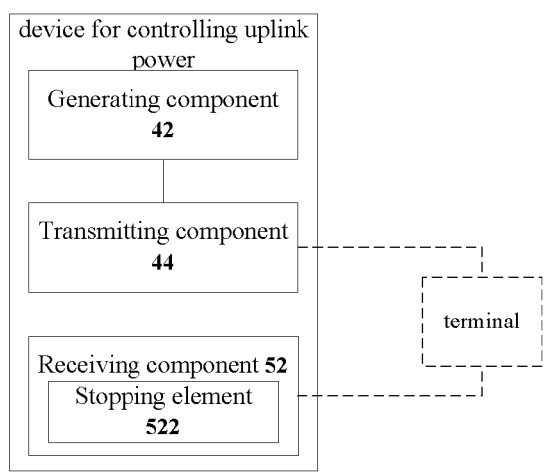
FIG. 6 shows the second preferred structural diagram of a device for controlling uplink power according to an embodiment of the disclosure.

FIG. 6 is the second preferred structural diagram of a device for controlling uplink power according to an embodiment of the disclosure. As shown in FIG. 6, the receiving component 52 preferably includes: a stopping element 522 configured to, in the case that the uplink data and/or the control information transmitted by the terminal are/is received successfully according to a piece of combined power control information among the plurality of pieces of combined power control information, stop receiving the uplink data and/or the control information according to other combined power control information among the plurality of pieces of combined power control information.

Figure 7:
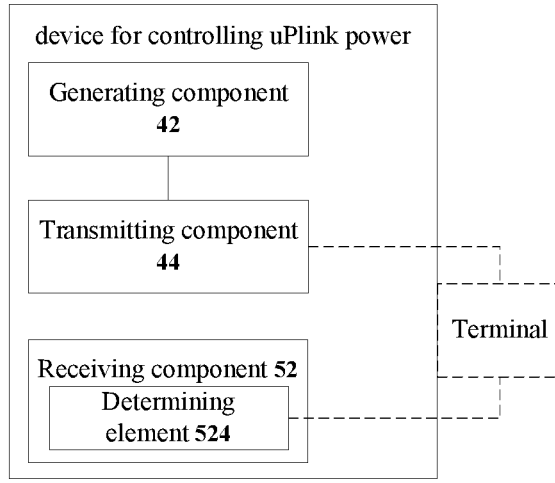
FIG. 7 shows the third preferred structural diagram of a device for controlling uplink power according to an embodiment of the disclosure.

FIG. 7 is the third preferred structural diagram of a device for controlling uplink power according to an embodiment of the disclosure. As shown in FIG. 7, the receiving component 52 preferably includes: a determining element 524 configured to determine configuration of an uplink sub-frame used for retransmitting the uplink data and/or the control information according to combined power control information used for receiving the uplink data and/or the control information last time; and the receiving component 52 is further configured to receive, through the uplink sub-frame configured according to the configuration, the uplink data and/or the control information retransmitted by the terminal.

The present embodiment further provides an uplink transmission device. The device is configured to implement the uplink transmission method. It needs to be noted that functional implementation corresponding to the device embodiment may be described and explained in combination with the method embodiment above.

Figure 8:
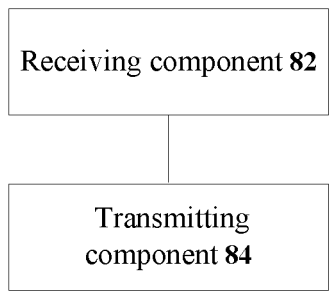
FIG. 8 shows a structural diagram of an uplink transmission device according to an embodiment of the disclosure.

FIG. 8 is a structural diagram of an uplink transmission device according to an embodiment of the disclosure. As shown in FIG. 8, the device includes a receiving component 82 and a transmitting component 84, wherein the receiving component 82 is configured to receive a plurality of pieces of combined power control information which is transmitted by a node and applied to uplink transmission of the node, wherein each of the plurality of pieces of combined power control information includes: an uplink power control factor and/or MCS offset information; and the transmitting component 82 is coupled to the receiving component and configured to transmit uplink data and/or control information according to the plurality of pieces of combined power control information.

Preferably, the uplink power control factor includes at least one of the followings: $P_{O\_PUSCH}$, $\alpha$, $P_{O\_NOMINAL\_PUSCH}$, $PL$, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a relevant offset factor of any uplink power control factor above, and a power offset factor $P_{offset}$, wherein $P_{O\_PUSCH}$, $\alpha$, $P_{O\_NOMINAL\_PUSCH}$, $PL$, $\beta_{offset}^{PUSCH}$, $P_{O\_PUCCH}$, $P_{O\_PUCCH\_offset}$, $P_{O\_NOMINAL\_PUCCH}$, and $P_{SRS\_OFFSET}$ are respectively defined according to the 3GPP TS36.213 V11.4.0, and the relevant offset factor is used for indicating an offset value of a corresponding uplink power control factor in a latter piece of combined uplink power control information in the plurality of pieces of combined power control information relative to a former piece of combined power control information.

Preferably, the $P_{offset}$ includes a power offset value for indicating uplink transmission power of a terminal, wherein the power offset value is used for indicating an offset of combined power control information, which is after first combined power control information in the plurality of pieces of combined power control information, relative to the first combined power control information.

Preferably, the receiving component 82 is further configured to receive the plurality of pieces of combined power control information which is transmitted by a plurality of nodes and respectively used for uplink transmission of the nodes.

Figure 9:
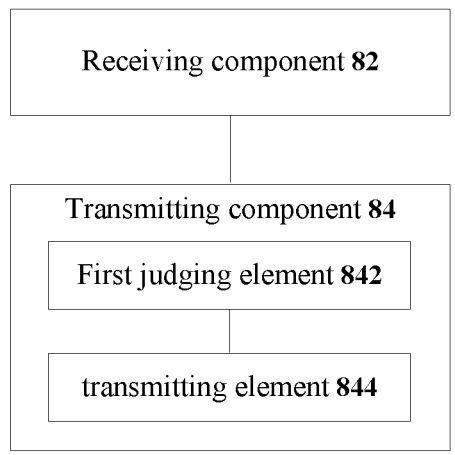
FIG. 9 shows the first preferred structural diagram of an uplink transmission device according to an embodiment of the disclosure.

FIG. 9 is the first preferred structural diagram of an uplink transmission device according to an embodiment of the disclosure. As shown in FIG. 9, the transmitting component 84 preferably includes: a first judging element 842 configured to, in the case that a terminal transmits the uplink data and/or the control information on one sub-frame, judge whether the uplink data and/or the control information of the plurality of nodes are/is transmitted on the one sub-frame simultaneously; a transmitting element 844 coupled to the first judging element 842 and configured to, in the case that only uplink data and/or control information of one node are/is transmitted on the one sub-frame, transmit the uplink data and/or the control information according to first combined power control information among the plurality of pieces of combined power control information of the one node.

Preferably, the transmitting element 844 is further configured to, in the case that uplink data and/or control information of the plurality of nodes are/is transmitted on the one sub-frame, transmit the uplink data and/or the control information according to one piece of the plurality of pieces of combined power control information respectively corresponding to the nodes.

Figure 10:
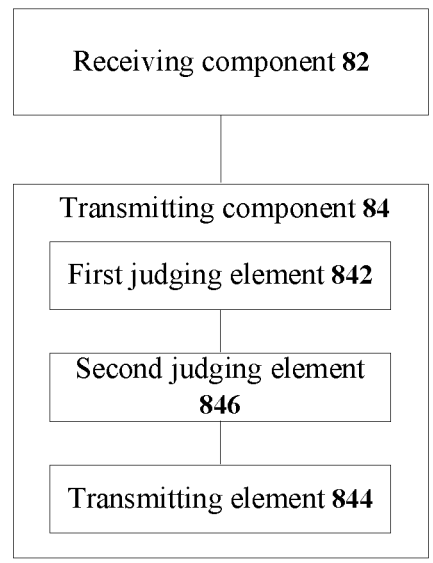
FIG. 10 shows the second preferred structural diagram of an uplink transmission device according to an embodiment of the disclosure.

FIG. 10 is the second preferred structural diagram of an uplink transmission device according to an embodiment of the disclosure. As shown in FIG. 10, the transmitting component 84 further preferably includes: a second judging element 846, wherein the second judging element 846 is coupled to the first judging element 842 and the transmitting element 844 and configured to, in the case that the uplink data and/or the control information are/is transmitted according to the one piece of the plurality of pieces of combined power control information corresponding to the nodes, judge whether the transmission power for transmitting the uplink data and/or the control information according to first combined power control information among the plurality of pieces of combined power control information corresponding to the nodes or according to combined power control information having the smallest index value exceeds the maximum transmission power of the terminal; and the transmitting element 844 is further configured to, in the case above, and in the case that the transmission power does not exceed the maximum transmission power of the terminal, transmit the uplink data and/or the control information according to the first combined power control information among the corresponding plurality of pieces of combined power control information.

Preferably, the second judging element 846 is further configured to, in the case that it is judged that the transmission power for transmitting the uplink data and/or the control information according to the first combined power control information among the plurality of pieces of combined power control information corresponding to the each node or the combined power control information having the smallest index value exceeds the maximum transmission power of the terminal, judge whether the transmission power for transmitting the uplink data and/or the control information according to second combined power control information among the plurality of combined power control information corresponding to the each node, or a node having a low priority among the plurality of nodes exceeds the maximum transmission power of the terminal; and the transmitting element 844 is configured to, in the case above, and in the case that the transmission power does not exceed the maximum transmission of the terminal, transmit the uplink data and/or the control information of the each node, or the node having a low priority among the plurality of nodes according to the second combined power control information among the corresponding plurality of pieces of combined power control information. Besides, uplink data and/or control information of a node having a high priority may be still transmitted by using the first combined power control information.

Preferably, the judging element 846 is further configured to, in the case that it is judged that the transmission power for transmitting the uplink data and/or the control information according to the second combined power control information among the plurality of combined power control information corresponding the node having a low priority among the plurality of nodes exceeds the maximum transmission power of the terminal, judge whether the transmission power for transmitting the uplink data and/or the control information according to the second combined power control information among the plurality of pieces of combined power control information corresponding to a node having a high priority among the plurality of nodes exceeds the maximum transmission power of the terminal; and the transmitting element 844 is further configured to, in the case above and in the case that the transmission power does not exceed the maximum transmission power of the terminal, transmit the uplink data and/or the control information of the node having a high priority according to the second combined power control information among the corresponding plurality of combined power control information.

Figure 11:
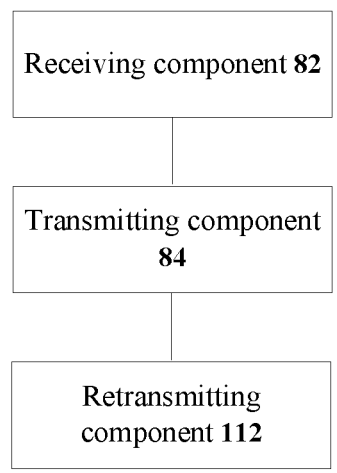
FIG. 11 shows the third preferred structural diagram of an uplink transmission device according to an embodiment of the disclosure.

FIG. 11 is the third preferred structural diagram of an uplink transmission device according to an embodiment of the disclosure. As shown in FIG. 11, the device preferably further includes: a retransmitting component 112 configured to retransmit the uplink data and/or the control information according to combined power control information for transmitting the uplink data and/or the control information last time.

It needs to be noted that the components and elements involved in the embodiments of the disclosure may be implemented by means of software, and may be also implemented by means of hardware. For example, the components and elements described in the present embodiment may be also arranged in a processor. In other words, the embodiment above may be described as follows: a processor including a receiving component 82 and a transmitting component, wherein the names of these components do not form limitation to the components themselves in some cases. For example, the receiving component may be also described as "a component configured to receive a plurality of pieces of combined power control information which is transmitted by a node and used for uplink transmission of the node".

Description and illustration will be provided below in combination with a preferred embodiment.

The present preferred embodiment provides a method and system for self-adaptive control and transmission, relating to an LTE-A system.

A method and system for interacting signaling between nodes are provided, including that:

uplink power control information is interacted between the nodes by using a basic resource element as a unit, and the basic resource element includes at least one of the following content:

1. uplink power control information of each specific terminal or terminal cluster is interacted by using the terminal or the terminal cluster as a basic unit;

2. uplink power control information of each basic unit resource is interacted by using the basic unit resource as a unit, wherein the basic unit resource includes at least one of the following resources:

1. a resource block, or a resource block pair, or an RBG or a sub-band;
2. a sub-frame;
3. a radio frame, wherein the uplink control information is mainly used for interacting power information on basic resource elements between the nodes, thereby ensuring that a node may acquire uplink power information on a basic resource element of another node.

Preferably, the uplink power control information includes at least one of the following information:

1. $P_{O\_PUSCH}$, representing the transmission power of PUSCH in a sub-frame;
2. $\alpha$, representing a power compensation factor;
3. $P_{O\_NOMINAL\_PUSCH}$;
4. PL, representing a downlink path loss estimated value;
5. $\beta_{offset}^{PUSCH}$;
6. $P_{O\_PUSCH}$;
7. $P_{O\_PUCCH\_offset}$;
8. $P_{O\_NOMINAL\_PUSCH}$;
9. $P_{SRS\_OFFSET}$ representing a power offset value of transmission of a monitoring reference signal sent by a terminal;
10. a power offset factor $P_{offset}$;

wherein the first parameter to the ninth parameter above may refer to definitions in a part of uplink power control in chapter 5.1 of 3GPP 36.213 (e.g. V11.4.0), wherein PL is an uplink path loss estimated value or a downlink relevant path loss estimated value. The parameter IO ($P_{offset}$) is an uplink transmission power offset value when another node interacts with the present node, and used for notifying another node of the average uplink power applied on a basic resource element of the node.

By means of a method and system for interacting signalling between nodes according to the preferred embodiment above, the uplink power control factor may be interacted between two double-link nodes, thereby ensuring that uplink power of a terminal is controlled more accurately and ensuring the accuracy and the average spectral efficiency of uplink reception when the two nodes serve for one double-link.

The present preferred embodiment further provides a method and system for a node to control the uplink power of a terminal, including that: the node configures at least two pieces of combined power control information for the terminal to control the terminal to transmit uplink data and control information according to the power control information.

Preferably, the combined power control information includes: an uplink power control factor and/or $\Delta_{Mcs}$.

Preferably, the uplink power control factor at least includes one of the following information: 1. $P_{O\_PUSCH}$; 2. $\alpha$; 3. $P_{O\_NOMINAL\_PUSCH}$; 4. PL; 5. $\beta_{offset}^{PUSCH}$; 6. $P_{O\_PUCCH}$; 7. $P_{O\_PUCCH\_offset}$; 8. $P_{O\_NOMINAL\_PUCCH}$; 9. $P_{SRS\_OFFSET}$; 10. a power offset factor $P_{offset}$; 11. relevant offset factors of 1 to 9, used for indicating an offset value of a corresponding factor in second combined uplink power control information relative to a factor in first combined power control information.

The first parameter to the ninth parameter above may refer to definitions in a part of uplink power control in chapter 5.1 of 3GPP 36.213 V11.4.0, wherein PL is an uplink path loss estimated value or a downlink relevant path loss estimated value. The tenth parameter is an uplink transmission power offset value for indicating an uplink power transmission offset of the $N^{th}$ combined power control information relative to the first combined control information.

Preferably, when receiving the uplink data transmitted by the terminal, a NodeB needs to receive, according to assumption of at least two kinds of combined power control information, the uplink data transmitted by the terminal.

Preferably, after successfully receiving, according to consumption of one kind of combined power control information, the uplink data transmitted by the terminal, the NodeB stops receiving the uplink data according to other consumption.

Preferably, when the NodeB indicates the terminal to retransmit the uplink data, the NodeB preferentially receives the uplink data on a subsequent sub-frame according to the last combined power control information corresponding to the uplink data.

Preferably, when the NodeB indicates the terminal to retransmit the uplink data, the NodeB preferentially receives the uplink data on a subsequent sub-frame according to the last MCS corresponding to the uplink data.

The present preferred embodiment further provides a method for a terminal to perform uplink transmission according to an uplink power control factor, including that the terminal receives at least two pieces of combined power control information configured by a NodeB and the terminal transmits uplink data and control information according to the power control information.

Preferably, the combined power control information includes: an uplink power control factor and/or $\Delta_{Mcs}$.

Preferably, the uplink power control factor at least includes one of the following information: 1. $P_{O\_PUSCH}$; 2. $\alpha$; 3. $P_{O\_NOMINAL\_PUSCH}$; 4. PL; 5. $\beta_{offset}^{PUSCH}$; 6. $P_{O\_PUCCH}$; 7. $P_{O\_PUCCH\_offset}$; 8. $P_{O\_NOMINAL\_PUCCH}$; 9. $P_{SRS\_OFFSET}$; 10. a power offset factor; 11. relevant offset factors of 1 to 9, used for indicating an offset value of a corresponding factor in second combined uplink power control information relative to the factor in first combined power control information.

The first parameter to the ninth parameter above may refer to definitions in a part of uplink power control in chapter 5.1 of 3GPP 36.213 V11.4.0, wherein PL is an uplink path loss estimated value or a downlink relevant path loss estimated value. The tenth parameter is an uplink transmission power offset value for indicating an uplink power transmission offset of the $N^{th}$ combined power control information relative to the first combined control information.

Preferably, the terminal separately receives combined power control information configured by two double-links.

Preferably, when transmitting the uplink data in one sub-frame, the terminal first judges whether uplink data of two double-link nodes is transmitted simultaneously on the one sub-frame, and if uplink data of only one node is transmitted, transmits the uplink data according to first combined power control information corresponding to the node, and if uplink data of two nodes is transmitted, transmits the uplink data according to second combined power control information corresponding to the nodes.

Preferably, when transmitting the uplink data on one sub-frame, the terminal first judges whether uplink data of two double-link nodes is transmitted simultaneously on the one sub-frame, and if uplink data of only one node is transmitted, transmits the uplink data according to first combined power control information corresponding to the node, and if uplink data of two nodes is transmitted, and when the transmission power for transmitting the uplink data according to the first combined power control information exceeds the maximum transmission power ($P_{CMAX}$) of the terminal, transmits the uplink data according to the second combined power control information corresponding to the nodes; or if uplink data of two nodes is transmitted, and when the transmission power for transmitting the uplink data according to the first combined power control information exceeds the maximum transmission power ($P_{CMAX}$) of the terminal, transmits, according to second combined power control information corresponding to the node having a low priority. If the transmission power for transmitting the uplink data of the node having a low priority still exceeds the maximum transmission power of the terminal, then the terminal preferentially transmits the uplink data of a node having a high priority also according to the second combined power control information corresponding to the node.

Preferably, when the terminal needs to retransmit the uplink data, the terminal preferentially transmits the uplink data according to the last combined power control information corresponding to the uplink data.

Preferably, when the terminal needs to retransmit the uplink data, the terminal preferentially transmits the uplink data according to the last MCS corresponding to the uplink data.

By means of a method for a node to control a terminal to control the uplink power, and a method for a terminal to perform uplink transmission according to an uplink power control factor in the preferred embodiments above, a NodeB configures a factor to control a terminal to control the power and an MCS applied to uplink transmission, and the terminal transmits uplink data according to the factor configured by the NodeB and practical sub-frame power configuration, thereby ensuring consistency of reception of the NodeB and transmission of the terminal.

The embodiments of the disclosure will be further described below in combination with the accompanying drawings so as to better understand the disclosure.

Space interaction may include conventional carrier air interface interaction (similar to Relay air interface interaction) and microwave air interface interaction, and nodes include all devices with a data transmission function, such as a Macro NodeB, a Pico, a Remote Radio Head (RRH), a Femto, a Home eNodeB (HeNB), a Relay Station (RS), a terminal, a UE and so on.

The names of the nodes may be used for representing cells and may be also used for representing different CCs in the embodiments and preferred embodiments above.

A double-link node may be also understood as a double-link CC or a double-link CC group, wherein different CC groups represent that there is a relatively long backhaul delay or there is no backhaul between the CC groups, and a terminal needs to be accessed to two CC groups simultaneously. CCs in the same CC group have relatively short backhaul delays or have no backhaul delay.

Embodiment 1

Figures 12, 13:
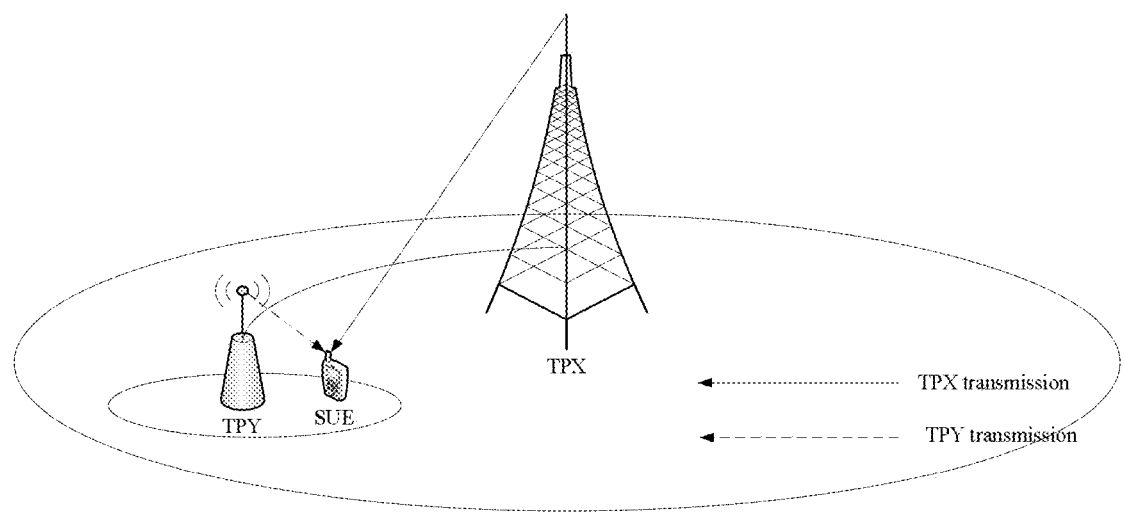
FIG. 12 shows a schematic diagram of a terminal served by two nodes according to a preferred embodiment of the disclosure.
FIG. 13 shows a schematic diagram of uplink transmission on different sub-frames according to a preferred embodiment of the disclosure.

It is provided that there are two nodes. FIG. 12 is a schematic diagram showing a terminal is served by two nodes according to a preferred embodiment of the disclosure. For example, these two nodes are a Macro eNodeB and a Pico eNodeB. As shown in FIG. 12, the Macro eNodeB and the Pico eNodeB are represented by TPX and TPY in turn. TPX and TPY serve for the same double-link UE (SUE), and there is no ideal backhaul link between TPX and TPY TPX acquires TPX uplink power control information corresponding to the terminal by measuring some uplink reference signals and channels, and transmits the uplink power control information to TPY, TPY acquires the TPY uplink power control information corresponding to the terminal by measuring some uplink reference signals and channels, and TPY transmits the uplink power control information to TPX.

Preferably, uplink power control information at least includes one of the following information: 1. $P_{O\_PUSCH}$; 2. $\alpha$; 3. $P_{O\_NOMINAL\_PUSCH}$; 4. PL; 5. $\beta_{offset}^{PUSCH}$; 6. $P_{O\_PUCCH}$; 7. $P_{O\_NOMINAL\_offset}$; 8. $P_{O\_NOMINAL\_PUCCH}$; 9. $P_{SRS\_OFFSET}$; 10. a power offset factor $P_{offset}$.

The first parameter to the ninth parameter above may refer to definitions in a part of uplink power control in chapter 5.1 of 3GPP 36.213 V11.4.0, wherein PL is an uplink path loss estimated value or a downlink relevant path loss estimated value, and the tenth parameter is an uplink transmission power offset value of a current node, which is interacted by the node, and the power offset value is used for notifying another node of the average uplink power applied by the node on a basic resource element.

After receiving an uplink power control factor of TPY, TPX will calculate, according to the uplink power control factor of TPY, the power and an MCS and so on applied by TPX to receive a corresponding terminal.

Sub-Embodiment 1

It is provided that a terminal UE1 is a double-link terminal and two linked nodes are TPX and TPY respectively. TPX transmits a $P_{O\_NOMINAL\_PUCCH,TPX}$ value to TPY. TPY considers that an uplink power value applied when uplink transmission is separately received is $P_{O\_NOMINAL\_PUSCH,TPX}$, and calculates a new $P_{O\_NOMINAL\_PUSCH,TPY,New}$ according to $P_{O\_NOMINAL\_PUSCH,TPX}$. When receiving a PUSCH transmitted by UE1, TPY first assumes that the transmission power of UE1 is calculated according to $P_{O\_NOMINAL\_PUCCH,TPY}$ and receives the PUSCH. If the PUSCH is not received successfully, then TPY assumes that the transmission power of UE1 is calculated according to $P_{O\_NOMINAL\_PUSCH,TPY,New}$, and receives the PUSCH. NACK is fed back if the PUSCH is not received successfully, and otherwise, ACK is fed back.

Sub-Embodiment 2

It is provided that a terminal UE1 is a double-link terminal and two linked nodes are TPX and TPY respectively. TPX transmits a $\alpha_{TPX}$ value to TPY. TPY considers that an uplink power value applied when uplink transmission is separately received is $\alpha_{TPY}$, and calculates a new $\alpha_{TPX,New}$ according to $\alpha_{TPX}$. When receiving a PUSCH transmitted by UE1, TPY first assumes that the transmission power of UE1 is calculated according to $\alpha_{TPY}$ and receives the PUSCH. If the PUSCH is not received successfully, then TPY assumes that the transmission power of UE1 is calculated according to $\alpha_{TPY,New}$ and receives the PUSCH. NACK is fed back if the PUSCH is not received successfully, and otherwise, ACK is fed back.

Sub-Embodiment 3

It is provided that a terminal UE1 is a double-link terminal and two linked nodes are TPX and TPY respectively. TPX transmits a $P_{offset}$ value to TPY. TPY considers that an uplink power value applied when uplink transmission is separately received is $P_{TPY}$, and calculates a new $P_{TPY,New}$ according to $P_{offset}$. When receiving a PUSCH transmitted by UE1, TPY first assumes that the transmission power of UE1 is calculated according to $P_{TPY}$ and receives the PUSCH. If the PUSCH is not received successfully, then TPY assumes that the transmission power of UE1 is calculated according to $P_{TPY,New}$ and receives the PUSCH. NACK is fed back if the PUSCH is not received successfully, and otherwise, ACK is fed back.

Embodiment 2

It is provided that there are two nodes, which are TPX and TPY in turn. TPX and TPY serve for the same double-link UE (SUE), and there is no ideal backhaul link between TPX and TPY. TPX acquires first TPX combined uplink power control information corresponding to the terminal by measuring some uplink reference signals and channels, wherein the first combined uplink power control information may be power control information of an R11 phase, then TPX receives a relevant power control factor transmitted by TPY or receives PHR statistics fed back by the UE to calculate second combined uplink power control information, wherein the second combined uplink power control information includes an uplink power control factor and/or $\Delta_{Mcs}$.

Preferably, the uplink power control factor at least includes one of the following information: 1. $P_{O\_PUSCH}$; 2. $\alpha$; 3. $P_{O\_NOMINAL\_PUSCH}$; 4. PL; 5. $\beta_{offset}^{PUSCH}$; 6. $P_{O\_PUCCH}$; 7. $P_{O\_PUCCH\_offset}$; 8. $P_{O\_NOMINAL\_PUCCH}$; 9. $P_{SRS\_OFFSET}$; 10. a power offset factor $P_{offset}$; 11. relevant offset factors of 1 to 9, used for indicating an offset value of a corresponding factor in the second combined uplink power control information relative to a factor in the first combined power control information.

$P_{O\_PUCCH\_offset}$ is an offset value of a PUCCH power factor $P_{O\_PUCCH}$.

The first parameter to the ninth parameter above may refer to definitions in a part of uplink power control in chapter 5.1 of 3GPP 36.213 V11.4.0, wherein PL is an uplink path loss estimated value or a downlink relevant path loss estimated value, and the tenth parameter is an uplink transmission power offset value for indicating an uplink power transmission offset of the $N^{th}$ combined power control information relative to the first combined control information.

Sub-Embodiment 1

It is provided that a terminal UE1 is a double-link terminal and two linked nodes are TPX and TPY respectively. TPX configures two power factors $P_{O\_PUCCH}$ and $P_{O\_PUSCH}$ for the terminal UE1 through high layer signalings. The terminal receives the two high layer signalings indicating configuration configured by TPX. FIG. 13 is a schematic diagram of uplink transmission on different sub-frames according to a preferred embodiment of the disclosure. As shown in FIG. 13, M represents that uplink transmission is performed on a CC of TPX1, P represents that uplink transmission is performed on a CC of TPX2, T represents that uplink transmission is performed simultaneously to CCs of TPX1 and TPX2. When UE1 only transmits uplink data of TPX on one sub-frame, UE1 calculates the transmission power of the uplink data according to $P_{O\_PUCCH}$. When UE1 transmits uplink data of TPX and TPY simultaneously on one sub-frame, UE1 calculates the transmission power of the uplink data according to $P_{O\_PUSCH}$. When receiving uplink data transmitted by UE1, TPX first assumes that the transmission power of the terminal is calculated according to $P_{O\_PUSCH}$, and if the uplink data is received successfully, TPX completes the reception and feeds back ACK. If the uplink data is not received successfully, TPX assumes that the transmission power of the terminal is calculated according to $P_{O\_PUSCH}$, and if the uplink data is received successfully, TPX completes the reception and feeds back ACK, and feeds back NACK otherwise.

Sub-Embodiment 2

It is provided that a terminal UE1 is a double-link terminal and two linked nodes are TPX and TPY respectively. TPX configures two power factors $P_{O\_PUCCH,TPX}$ and $P_{O\_PUCCH,TPX}$ for the terminal UE1 through high layer signalings. TPY configures two power factors $P_{O\_PUCCH,TPY}$ and $P_{O\_PUCCH,TPX}$ for the terminal UE1 through high layer signalings. The terminal receives the two high layer signalings configured by TPX and TPY respectively. As shown in FIG. 13, when UE1 only transmits uplink data of TPX on one sub-frame, UE1 calculates the transmission power of the uplink data according to $P_{O\_PUCCH,TPX}$. When UE1 only transmits uplink data of TPY on one sub-frame, UE1 calculates the transmission power of the uplink data according to $P_{O\_PUCCH,TPY}$. When UE1 transmits uplink data of TPX and TPY simultaneously on one sub-frame, UE1 first judges whether the sum of the transmission power calculated according to $P_{O\_PUCCH,TPX}$ and the transmission power calculated according to $P_{O\_PUCCH,TPY}$ exceeds the maximum power of the terminal, and if no, UE1 transmits uplink data of TPX on the sub-frame according to the power calculated according to $P_{O\_PUSCH,TPX}$, and transmits uplink data of TPY on the sub-frame according to the power calculated by $P_{O\_PUSCH,TPY}$. Otherwise, it is provided that the priority of TPX is higher than that of TPY, then UE1 judges whether the transmission power calculated according to $P_{O\_PUSCH,TPY}$ of TPY and $P_{O\_PUSCH,TPX}$ of TYX exceeds the maximum power of the terminal when uplink data is transmitted, and if no, UE1 transmits the uplink data of TPX on the sub-frame according to the power calculated by $P_{O\_PUCCH,TPX}$, and transmits the uplink data of TPY on the sub-frame according to the power calculated by $P_{O\_PUSCH,TPY}$. Otherwise, the terminal judges whether the transmission power calculated according to $P_{O\_PUSCH,TPX}$ and $P_{O\_PUSCH,TPX}$ to transmit the uplink data exceeds the maximum transmission power of the terminal, and if no, UE1 transmits the uplink data of TPX on the sub-frame according to the transmission power calculated by $P_{O\_PUCCH,TPX}$, and transmits the uplink data of TPX on the sub-frame according to the transmission power calculated by $P_{O\_PUSCH,TPX}$. Otherwise, the terminal reduces the transmission power of the two pieces of uplink data according to a certain proportional relation, wherein the proportional relation may be isometric reduction, or the uplink transmission power corresponding to a node having a low priority is reduced preferentially.

When receiving uplink data transmitted by UE1, TPX first assumes that the transmission power of the terminal is calculated according to $P_{O\_PUSCH,TPX}$, and if the uplink data is received successfully, completes the reception and feeds back ACK Otherwise, TPX assumes that the transmission power of the terminal is calculated according to $P_{O\_PUSCH,TPX}$, completes the reception and feeds back ACK if the uplink data is received successfully, and feeds back NACK otherwise.

When receiving uplink data transmitted by UE1, TPY first assumes that the transmission power of the terminal is calculated according to $P_{O\_PUSCH,TPX}$, and if the uplink data is received successfully, completes the reception and feeds back ACK Otherwise, TPY assumes that the transmission power of the terminal is calculated according to $P_{O\_PUSCH,TPX}$, completes the reception and feeds back ACK if the uplink data is received successfully, and feeds back NACK otherwise.

Sub-Embodiment 3

It is provided that a terminal UE1 is a double-link terminal and two linked nodes are TPX and TPY respectively. TPX configures two power factors $P_{O\_PUSCH,TPX}$ and $P_{O\_PUCCH,TPY}$, and an MCS adjustment factor $\Delta_{Mcs}$ corresponding to $P_{O\_PUCCH,TPX}$ for the terminal UE1 through high layer signalings. TPY configures two power factors $P_{O\_PUCCH,TPX}$ and $P_{O\_PUSCH,TPY}$ "and" corresponding to $P_{O\_PUSCH,TPX}$ for the terminal UE1 through high layer signalings. The terminal receives the two high layer signalings indicating configuration configured by TPX and TPY respectively. As shown in FIG. 13, when UE1 only transmits uplink data of TPX on one sub-frame, UE1 calculates the transmission power of the uplink data according to $P_{O\_PUSCH,TPX}$, and transmits the uplink data according to an MCS level configured in TPX DCI. When UE1 only transmits uplink data of TPY on one sub-frame, UE1 calculates the transmission power of the uplink data according to $P_{O\_PUCCH,TPY}$, and transmits the uplink data according to an MCS level configured in TPY DCI. When UE1 transmits uplink data of TPX and TPY simultaneously on one sub-frame, UE1 first judges whether the sum of the transmission power calculated according to $P_{O\_PUSCH,TPX}$ and the transmission power calculated according to $P_{O\_PUSCH,TPY}$ exceeds the maximum power of the terminal, and if no, UE1 transmits uplink data of TPX on the sub-frame according to the transmission power calculated by $P_{O\_PUSCH,TPX}$ and the MCS level configured in TPX DCI, and transmits uplink data of TPY on the sub-frame according to the power calculated by $P_{O\_PUSCH,TPX}$ and the MCS level configured in TPY DCI. Otherwise, it is provided that the priority of TPX is higher than that of TPY, then UE1 judges whether the power calculated according to $P_{O\_PUSCH,TPY}$ of TPY and $P_{O\_PUCCH,TPX}$ of TYX exceeds the maximum power of the terminal when the uplink data is transmitted, and if no, UE1 transmits the uplink data of TPX on the sub-frame according to the power calculated according to $P_{O\_PUSCH,TPX}$ and the MCS level configured in TPX DCI, and transmits the uplink data of TPY on the sub-frame according to the power calculated according to $P_{O\_PUSCH,TPY}$, and an MCS level acquired after the MCS level configured in TPY DCI is adjusted according to $\Delta_{Mcs}$. Otherwise, the terminal judges whether the transmission power, which is calculated according to $P_{O\_PUSCH,TPY}$ and $P_{O\_PUSCH,TPY}$, for transmitting the uplink data exceeds the maximum transmission power of the terminal, and if no, UE1 transmits the uplink data of TPX on the sub-frame according to the power calculated by $P_{O\_PUCCH,TPX}$ and an MCS level acquired after the MCS level configured in TPX DCI is adjusted according to $\Delta_{Mcs}$ and transmits the uplink data of TPX on the sub-frame according to the power calculated by $P_{O\_PUSCH,TPY}$ and an MCS level acquired after the MCS level configured in TPY DCI is adjusted according to $\Delta_{Mcs}$. Otherwise, the terminal reduces the transmission power of the two pieces of uplink data according to a certain proportional relation, wherein the proportional relation may be isometric reduction, or the uplink transmission power corresponding to a node having a low priority is reduced preferentially. The MCS levels are respectively the MCS level acquired after the MCS level configured in TPX DCI is adjusted according to $\Delta_{Mcs}$ and the MCS level acquired after the MCS level configured in TPY DCI is adjusted according to $\Delta_{Mcs}$.

When receiving uplink data transmitted by UE1, TPX first assumes that the transmission power of the terminal is calculated according to $P_{O\_PUSCH,TPX}$ and a corresponding MCS level is an MCS level configured in DCI, and if the uplink data is received successfully, completes the reception and feeds back ACK. Otherwise, TPX assumes that the transmission power of the terminal is calculated according to $P_{O\_PUSCH,TPX}$ and a corresponding MCS level is an MCS level adjusted according to $\Delta_{Mcs}$, completes the reception and feeds back ACK if the uplink data is received successfully, and feeds back NACK otherwise.

When receiving uplink data transmitted by UE1, TPY first assumes that the transmission power of the terminal is calculated according to $P_{O\_PUSCH,TPX}$ and a corresponding MCS level is an MCS level configured in DCI, and if the uplink data is received successfully, completes the reception and feeds back ACK. Otherwise, TPY assumes that the transmission power of the terminal is calculated according to $P_{O\_PUSCH,TPY}$ and a corresponding MCS level is an MCS level adjusted according to $\Delta_{Mcs}$, completes the reception and feeds back ACK if the uplink data is received successfully, and feeds back NACK otherwise.

The embodiments above provide description by taking $P_{O\_PUSCH}$ as an example. In other words, a power factor $P_{O\_PUSCH}$ in the embodiments may be any other factor or a combination of a plurality of factors among uplink power control factors, and is not limited to $P_{O\_PUSCH}$.

In the embodiments above, if it is necessary to adjust power, it may be considered that requirements of data retransmission power are satisfied preferentially, and requirements of non-data retransmission power are considered if there is remaining power, or it may be considered that an MCS of data retransmission is not changed, thereby ensuring the accuracy of combination of Incremental Redundancy (IR).

It may be considered that the priorities in the embodiments above are divided according to node indexes, or the types (e.g. a PUSCH, a PUCCH, an SRS and so on belong to different service types) of transmission services, or different transmission types and different CSI process indexes in the same type. For example, different transmission types in the same type for a PUSCH include: a pure user data PUSCH type, a PUSCH type for hybrid transmission of user data, and control CSI and/or Hybrid Automatic Repeat Request (HARQ) information, and a PUSCH type that only transmits CSI and/or HARQ information, and different transmission types in the same type for a PUCCH include: different HARQ formats, 1a, 1b, 2a, 2b, 2c, 3 and so on, and different transmission types in the same type for CSI include: different feedback types including Type 1, Type 2, Type 2a, Type 2b, Type 2c, Type 3, Type 4, Type 5, Type 6 and so on. Specific definitions of different types may refer to related content of 3GPP36.213V11.4.0.

In the second embodiment, a method for a NodeB to obtain the uplink power control information of another double-link node to calculate second combined power control information is not limited in the embodiment. Preferably, the uplink power control information may be obtained by interacting some power control information between the nodes or statistically counting PHR fed back by a terminal, wherein the PHR fed back by the terminal may be PHR of two nodes, which is fed back by the terminal, or PHR of different sub-frames, which are fed back in a time-division manner.

INDUSTRIAL APPLICABILITY

By means of the embodiments of the disclosure, a node respectively receives uplink power control information transmitted by other nodes using a basic resource element as a unit, and transmits the uplink power control information of the node to the other nodes by using the basic resource element as a unit, wherein the basic resource element includes at least one of the followings: a terminal or a terminal cluster, and a basic unit resource. The disclosure solves the problem in the related art that an uplink power reduction method cannot ensure uplink transmission reliability in a double-link scenario, thus ensuring the accuracy of uplink transmission in the double-link scenario.

Obviously, those skilled in the art should understand that, each component or each step of the disclosure may be implemented by a universal computing device. They may be concentrated on a single computing device or distributed on a network composed of a plurality of computing devices. Optionally, they may be implemented by program codes executable by a computing device so that they may be stored in a storing device and executed by the computing device, or they may be implemented by respectively fabricating them into each integrated circuit component, or by fabricating a plurality of components or steps of them into a single integrated circuit component. In this way, the disclosure is not limited to any specific combination of software and hardware.

The above are only preferred embodiments of the disclosure, and are not used for limiting the invention. For those skilled in the art, the disclosure may have various alterations and variations. Any modification, equivalent replacement, improvement and so on made within the spirit and principle of the disclosure should be included within the scope of protection of the disclosure.

What is claimed is:

1. A method for interacting signaling between nodes, comprising:

respectively receiving, by a node, uplink power control information of other nodes transmitted, using a basic resource element as a unit, by the other nodes; and transmitting, by a node, using the basic resource element as a unit, the uplink power control information of the node to the other nodes respectively;

wherein the basic resource element comprises at least one of the followings: a terminal cluster, and a basic unit resource;

wherein the basic unit resource comprises at least one of the followings: a resource block, a resource block pair, a Resource Block Group (RBG), a sub-band, a sub-frame, and a radio frame;

wherein the uplink power control information comprises at least one of the followings:

$P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, and $P_{SRS\_OFFSET}$ are respectively defined according to the $3^{rd}$ Generation Partnership Project (3GPP) TS36.213V11.4.0;

wherein the $P_{offset}$ comprises a power offset value of uplink transmission of a node transmitting the uplink power control information, wherein the power offset value is used for indicating average uplink power of the basic resource element of the node transmitting the uplink power control information.

2. The method according to claim 1, wherein the uplink power control information is used for indicating uplink power information of the basic resource element of the node transmitting the uplink power control information.

3. A method for controlling uplink power, comprising:
generating a plurality of pieces of combined power control information, wherein each of the plurality of pieces of combined power control information comprises: an uplink power control factor and/or Modulation and Coding Scheme (MCS) offset information; and
transmitting the plurality of pieces of combined power control information to a terminal;
wherein the uplink power control factor comprises at least one of the followings:
$P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a relevant offset factor of any uplink power control factor above, and a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, and $P_{SRS\_OFFSET}$ are respectively defined according to the 3$^{rd}$ Generation Partnership Project (3GPP) TS36.213V11.4.0, wherein the relevant offset factor is used for indicating an offset value of a corresponding uplink power control factor in a latter piece of combined uplink power control information in the plurality of pieces of combined power control information relative to a former piece of combined power control information;
wherein the $P_{offset}$ comprises a power offset value for indicating uplink transmission power of the terminal, wherein the power offset value is used for indicating an offset of combined power control information, which is after first combined power control information in the plurality of pieces of combined power control information, relative to the first combined power control information.

4. The method according to claim 3, wherein each piece of combined power control information is used for controlling power used by the terminal to transmit uplink data and/or control information.

5. The method according to claim 4, wherein after transmitting the plurality of pieces of combined power control information to the terminal, the method further comprises:
according to the plurality of pieces of combined power control information, receiving the uplink data and/or the control information transmitted by the terminal.

6. The method according to claim 5, wherein receiving, according to the plurality of pieces of combined power control information, the uplink data and/or the control information transmitted by the terminal comprises:
in the case that the uplink data and/or the control information transmitted by the terminal are/is received successfully according to a piece of combined power control information among the plurality of pieces of combined power control information, stopping receiving the uplink data and/or the control information according to other combined power control information among the plurality of pieces of combined power control information.

7. The method according to claim 5, wherein after receiving, according to the plurality of pieces of combined power control information, the uplink data and/or the control information transmitted by the terminal, the method further comprises:
determining, according to combined power control information used for receiving the uplink data and/or the control information last time, configuration of an uplink sub-frame used for retransmitting the uplink data and/or the control information; and
receiving, through the uplink sub-frame determined according to the configuration, the uplink data and/or the control information retransmitted by the terminal.

8. An uplink transmission method, comprising:
receiving a plurality of pieces of combined power control information which is transmitted by a node and applied to uplink transmission of the node, wherein each of the plurality of pieces of combined power control information comprises: an uplink power control factor and/or Modulation and Coding Scheme (MCS) offset information; and
transmitting uplink data and/or control information according to the plurality of pieces of combined power control information;
wherein receiving the plurality of pieces of combined power control information transmitted by the node comprises: receiving the plurality of pieces of combined power control information which is transmitted by a plurality of nodes and respectively used for uplink transmission of the plurality of nodes;
wherein in the case that the terminal transmits the uplink data and/or the control information in one sub-frame, transmitting the uplink data and/or the control information according to the plurality of pieces of combined power control information comprises: judging whether the uplink data and/or the control information of the two nodes are/is transmitted in the one sub-frame simultaneously; and in the case that only uplink data and/or control information of one node are/is transmitted on the one sub-frame, transmitting the uplink data and/or the control information according to first combined power control information among the plurality of pieces of combined power control information of the one node or according to combined power control information with the smallest index value.

9. The method according to claim 8, wherein the uplink power control factor comprises at least one of the followings:
$P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, $P_{SRS\_OFFSET}$, a relevant offset factor of any uplink power control factor above, and a power offset factor $P_{offset}$, wherein $P_{O\_PUSCH}$, $\alpha$, $P_{O\_NOMINAL\_PUSCH}$, PL, $\beta_{offset}^{PUSCH}$, $P_{O\_PUCCH}$, $P_{O\_PUCCH\_offset}$, $P_{O\_NOMINAL\_PUCCH}$, and $P_{SRS\_OFFSET}$ are respectively defined according to the 3$^{rd}$ Generation Partnership Project (3GPP) TS36.213V11.4.0, wherein the relevant offset factor is used for indicating an offset value of a corresponding uplink power control factor in a latter piece of combined uplink power control information in the plurality of pieces of combined power control information relative to a former piece of combined power control information.

10. The method according to claim 9, wherein the $P_{offset}$ comprises a power offset value for indicating uplink transmission power of a terminal, wherein the power offset value is used for indicating an offset of combined power control information, which is after first combined power control information in the plurality of pieces of combined power control information, relative to the first combined power control information.

11. The method according to claim 8, wherein in the case that the terminal transmits the uplink data and/or the control information in one sub-frame, transmitting the uplink data and/or the control information according to the plurality of pieces of combined power control information comprises:

judging whether the uplink data and/or the control information of the two nodes are/is transmitted on the one sub-frame simultaneously; and in the case that uplink data and/or control information of the plurality of nodes are/is transmitted on the one sub-frame, transmitting the uplink data and/or the control information according to one piece of the plurality of pieces of combined power control information respectively corresponding to each node.

12. The method according to claim 11, wherein transmitting the uplink data and/or the control information according to one piece of the plurality of pieces of combined power control information respectively corresponding to the each node comprises:

judging whether the transmission power for transmitting the uplink data and/or the control information according to first combined power control information among the plurality of pieces of combined power control information corresponding to the each node or according to combined power control information having the smallest index value exceeds the maximum transmission power of the terminal; and based on that the transmission power exceeds the maximum transmission power of the terminal, transmitting the uplink data and/or the control information according to the first combined power control information among the corresponding plurality of pieces of combined power control information.

13. The method according to claim 12, wherein in the case that it is judged that the transmission power for transmitting the uplink data and/or the control information according to the first combined power control information among the plurality of pieces of combined power control information corresponding to the each node or the combined power control information having the smallest index value exceeds the maximum transmission power of the terminal, transmitting the uplink data and/or the control information according to one piece of the plurality of pieces of combined power control information respectively corresponding to the each node further comprises:

judging whether the transmission power for transmitting the uplink data and/or the control information according to second combined power control information among the plurality of pieces of combined power control information, which are corresponding to the each node or a node having a low priority among the plurality of nodes, exceeds the maximum transmission power of the terminal; and based on that the transmission power does not exceed the maximum transmission power of the terminal, transmitting the uplink data and/or the control information of the each node or the node having the low priority among the plurality of nodes according to the second combined power control information among the corresponding plurality of pieces of combined power control information.

14. The method according to claim 13, wherein in the case that it is judged that the transmission power for transmitting the uplink data and/or the control information according to the second combined power control information among the plurality of combined power control information corresponding the node having the low priority among the plurality of nodes exceeds the maximum transmission power of the terminal, transmitting the uplink data and/or the control information according to one piece of the plurality of pieces of combined power control information respectively corresponding to the each node further comprises:

judging whether the transmission power for transmitting the uplink data and/or the control information according to the second combined power control information among the plurality of pieces of combined power control information corresponding to a node having a high priority among the plurality of nodes exceeds the maximum transmission power of the terminal; and based on that the transmission power does not exceed the maximum transmission power of the terminal, transmitting the uplink data and/or the control information of the node having a high priority according to the second combined power control information among the corresponding plurality of combined power control information.

15. The method according to claim 8, wherein after transmitting the uplink data and/or the control information according to the plurality of combined power control information, the method further comprises:

retransmitting the uplink data and/or the control information according to combined power control information for transmitting the uplink data and/or the control information last time.

* * * * *